United States Patent [19]
Olszewski

[11] Patent Number: 4,464,857
[45] Date of Patent: Aug. 14, 1984

[54] FISHING LURE AND METHOD OF FABRICATION

[76] Inventor: Daniel P. Olszewski, R3, Box 972, South Merrit Island, Fla. 32952

[21] Appl. No.: 369,805

[22] Filed: Apr. 19, 1982

Related U.S. Application Data

[63] Continuation of Ser. No. 142,868, Apr. 20, 1980, abandoned.

[51] Int. Cl.$^3$ ............................................. A01K 85/00
[52] U.S. Cl. .................................. 43/42.33; 43/42.53
[58] Field of Search ............................ 43/42.33, 42.34

[56] References Cited

U.S. PATENT DOCUMENTS

| | | | |
|---|---|---|---|
| 2,241,941 | 5/1941 | Bates | 43/42.33 |
| 2,613,471 | 10/1952 | Traycik | 43/42.33 |
| 3,360,882 | 1/1968 | Belokin | 43/42.33 |
| 3,528,189 | 9/1970 | Lilley | 43/42.33 |
| 3,952,445 | 4/1976 | Liebert | 43/42.34 |
| 4,112,608 | 9/1978 | McGahee | 43/42.09 |

Primary Examiner—Nicholas P. Godici
Assistant Examiner—Marc Hodak
Attorney, Agent, or Firm—Harold Gell

[57] ABSTRACT

A fishing lure and method of fabrication is presented wherein the lure is comprised of a central core which includes hook hangers, leader connection means and a depth controlling weight. The central core is surrounded by an image of the bait being duplicated by the fishing lure and that assembly is encased in a clear plastic shell which includes lenses formed within the plastic material to create a life-like visual impression of various portions of the bait such as eyes, fins and gills.

13 Claims, 8 Drawing Figures

FISHING LURE AND METHOD OF FABRICATION

This application is a continuation of application Ser. No. 142,868, filed Apr. 20, 1980, now abandoned.

TECHNICAL FIELD

This invention relates to fishing lures which have a life-like appearance and are created by assembling a central section incorporating hook connection means, a pattern which creates a visual image relating to a specific bait and an outer, transparent protective body.

BACKGROUND OF PRIOR ART

Fishing lures have progressed from an early state of simple metal or wood objects that hopefully would visually appear to be an object fit for consumption by the quarry to the state of the present technology which utilizes plastics and numerous molding and coloring techniques to achieve the sought after simulation of an injured bait fish. The majority of lures are comprised of an injection molded body and a painted design which is both time consuming to apply to the exterior surface of the lure body and subjected to considerable damage in the tackle box, while being retrieved, and if the lure is successful, from the fish's teeth.

Some attempts have been made to protect the surface of the lure and they have met with moderate success but at the cost of the like-like appearance of the final product. For instance, in the prior art attempts have been made to create artificial bait or lures by attaching hooks to a clear plastic tubular container into which a minnow or similar bait fish is inserted. This approach is quite unsuccessful for the bait fish within the plastic container is motionless and in use dragged through the water with no more action than might be expected from a stick. In fact, it is speculated that such lures appear to fish as no more than an inanimate object being dragged through the water.

The state of clear body fish lures was then advanced by the addition of diving planes or other action creating appendages to the clear plastic body and in many instances a replica of the bait fish such as a picture was contained within the clear plastic body. The use of the replica permitted the clear plastic body to be given a more fish-like shape, but still lures of this type did not prove overly successful because the mounting hardware for the action creating appendages and the hook attachment fittings was visible through the clear plastic body and thus the visual image was destroyed.

OBJECTIVES OF THE INVENTION

Therefore, it is a primary objective of the present invention to provide a fishing lure that has a clear plastic body to protect a visual pattern which will create a life-like image to the fish quarry and at the same time conceal the various mechanism for hook attachment, ballast, and action imparting appliances.

It is a still further objective of the present invention to provide a fishing lure comprised of a center body section incorporating hook hangers, a bait duplicating pattern adapted to conceal the center body section and a clear plastic outer covering the hold the components of the lure together and provide a hydrodynamic surface which will impart the proper motion to the lure.

A further objective of the present invention is to provide a clear plastic outer covering for a fishing lure wherein lens means are formed within the clear plastic covering to create the visual effect of life-like motion to eyes, fins and other appendages of the replica of bait contained within the lure.

A still further objective of the present invention is to provide a weight means within the center lure section of a multiple part fishing lure wherein the effective average specific gravity of the lure may be varied.

The foregoing and other objectives of the invention will become apparent in light of the specification, drawings and claims which form a part of this patent.

SUMMARY OF THE INVENTION

This invention presents a fishing lure and method of assembling fishing lures of the type comprised of a center body section incorporating an inner core which functions as an alignment pin for assembly operations and as a support for the various hardware apparatus required for hook attachment, leader attachment, action imparting implement attachment and ballast weights. The center body section is combined with a design pattern adapted to create the visual image of a particular bait. The visual image may be in the form of a printed or photographically reproduced picture or it may be a paint scheme but in all cases it is sufficiently opaque to mask the various attachment fitting means contained within the center body section of the lure. A clear plastic outer body shell seals the center body section and bait replica design. The outer plastic shell includes lenses formed within the inner surface of the plastic material to create a life-like visual image with respect to the portions of the bait duplicating pattern within the lure. These lenses may be placed over the eyes, gills and/or fins so that as relative motion occurs between the lure and the observer, the index of refraction will change with respect to the pattern and create the illusion of motion of the various parts of the bait with respect to the basic bait body. This optical illusion is also created by incorporating various curvatures to the outer surface of the lure clear plastic outer body.

The method of fabricating the lure described herein is comprised of the steps of forming the inner core; adding the various attachment means and ballast weight to create a center body section; placing bait duplicating image generating patterns over the sides of the center body section; and encasing the resultant assembly in a clear plastic body shell.

DESCRIPTION OF THE INVENTION

Figure 1:
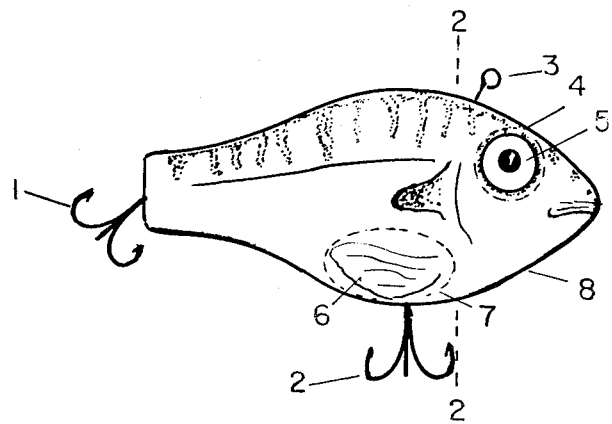
FIG. 1 is a side view of a fishing lure incorporating the novel features of this invention.

FIG. 1 is a side view of the present invention illustrating a fishing lure constructed in accordance with the procedures set forth herein. Note that the life-like appearance of the lure is not hampered by unsightly hook attachment fittings or similar objects which obstruct the view of the image of the bait fish contained within the clear plastic outer sheath. Hooks 1 and 2 are secured to the fishing lure in the illustrated preferred embodiment by a hook hanger such as that described in U.S. Pat. No. 4,112,608 on "Method And Apparatus For Fabricating Fishing Lures Etc.". The use of this type of hook hanger minimizes the amount of unnatural protrusions present along the outer edge of the lure body. A standard screw eye 3 is provided to attach the leader to the lure or if desired, a connector such as that described in U.S. Pat. No. 3,869,821 on "Connector Combined With Fishing Float, Leader, Sinker or Lure Apparatus" may be incorporated.

A natural appearance is enhanced by positioning a lens 4 over the eye 5 of the bait fish so that the eye will appear to move with respect to the body of the fish as the lure moves relative to an observer. This same principle is utilized to impart the visual impression of motion to fin 6 which is positioned under a lens area 7 of the transparent outer shell 8 of the lure body.

Figure 2:
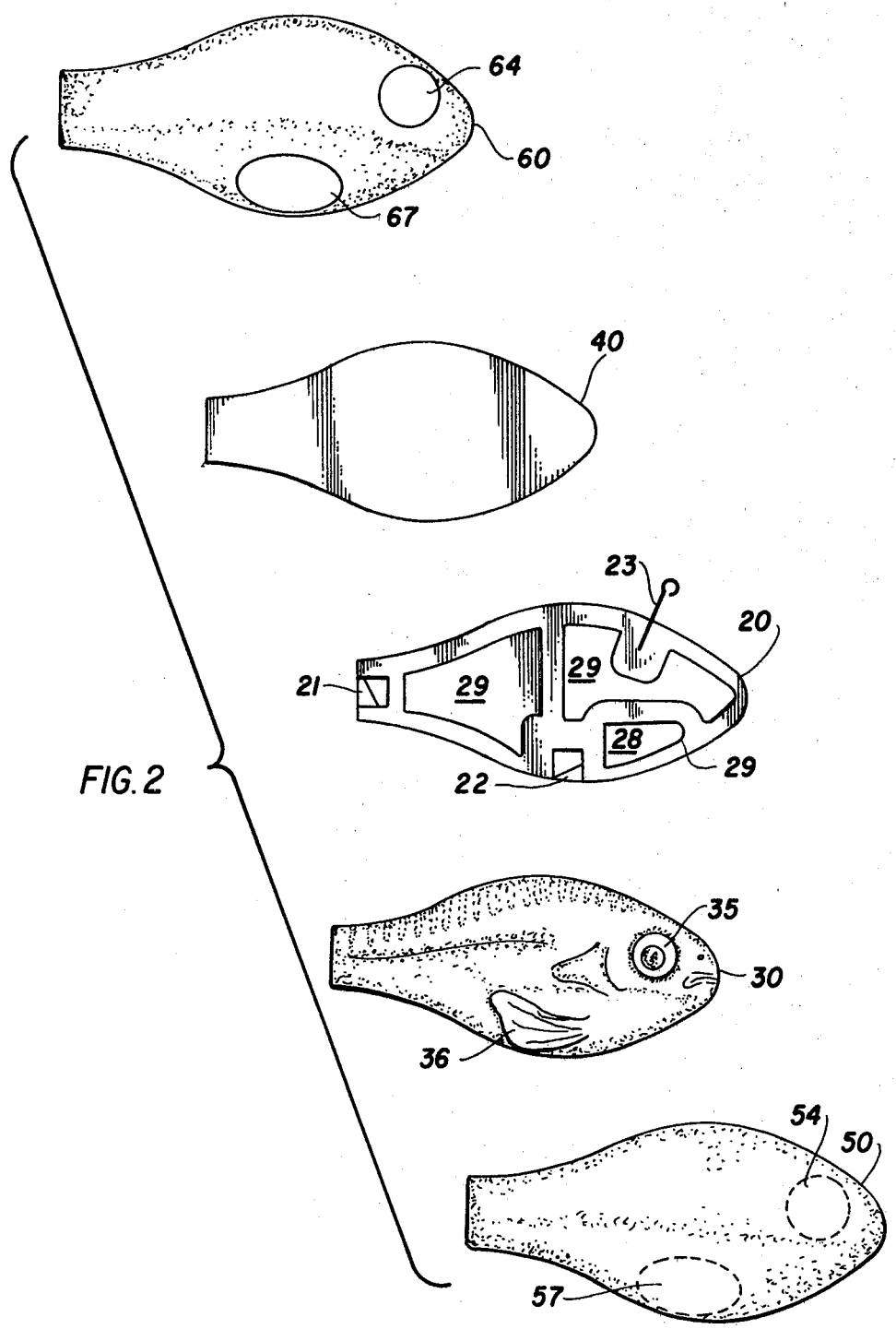
FIG. 2 is an exploded view of a preferred embodiment of the present invention.

FIG. 2 presents an exploded view illustrating the five primary sections of a fishing lure in accordance with this patent.

The nucleus of the lure is comprised of a central core 20 which in a preferred embodiment is in the form of a plastic framework. It incorporates hook hangers 21 and 22 which are adapted to provide a means to readily attach hooks to a completed lure. A leader attaching means 23 is secured to the central lure body 20 by any of the well known techniques such as screw eyes or bent pin/bore techniques etc. Lightening openings 29 are created within the central lure body 20 so that the completed lure will have a density less than that of water to permit fabrication of a floating lure. To change the effective specific gravity of the overall lure to create an artificial bait which will function properly at any desired depth, a weight of preselected mass may be adapted to fit within one or more of the lightening openings 29. In a preferred embodiment, and in most applications, the weight 28 is normally placed in the forward, lower lightening opening to enhance lure action as it is retrieved through the water.

Figure 3:
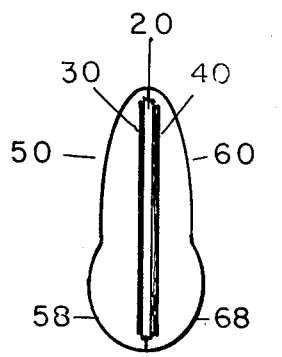
FIG. 3 is a sectional view of the preferred embodiment taken along the lines 2—2 of FIG. 1.

Bait replicas 30 and 40 are adapted to provide a simulation of a desired bait fish and dimensioned to cover the sides of the center lure body 20, see for instance FIG. 3 wherein like reference designators indicate like parts. The replica sections 30 and 40 function to create a visual image of a desired bait fish and to mask the hook holders 21 and 22, leader fitting 23 and ballast 28 as well as lightening openings 29 so that the image created by the lure will be a continuous and life-like replica. In a preferred embodiment the replicas are graphically reproduced on a film of material which will not be affected by water.

An advantage of this particular structure is that it enables the manufacturer to meet a relatively large variety of special orders in a fairly short turn around time because a basic lure may be radically changed by the inclusion of different bait replicas 30 and 40 which require a simple photolithographic process to duplicate as contrasted to the normal production means for fishing lures which require an elaborate silk screening or similar process to paint the exterior lure bodies when color and pattern changes are necessitated by specific customer orders and user demands.

A pair of clear plastic outer body halves 50 and 60 are dimensioned to encase the center lure body 20 and patterns 30 and 40. The body halves 50 and 60 are sealed together to create a water tight compartment so that the lightening openings 29 in the center body section 20 create buoyancy chambers which may be partially overcome by the addition of ballast 28 as previously discussed. The clear plastic body halves 50 and 60 include concaved lenses 54 and 64 formed on the surface of the lure half which faces the bait replica 30 or 40. These concaved lens areas are positioned over the bait replica eye 35 and function to create the visual impression that the eye is constantly looking at the observer as the lure body moves relative to the observer. This apparent relative motion of the eye with respect to the rest of the bait or lure enhances the life-like appearance of the lure as it is retrieved.

Additional lens segments 57 and 67 are formed on the inner surfaces of lure body halves 50 and 60 in the vicinity of the fin 36 to create the visual impression of fin motion in a manner similar to that utilized to create the visual impression of eye motion.

If desired, additional lens areas may be formed within the inner surfaces of the lure body halves to create various other optical illusions.

FIG. 3 is a cutaway section of the preferred embodiment illustrated in FIGS. 2 and 1 which depicts the relative dimensions of the various segments exploded in FIG. 2. Note that the clear plastic lure halves 50 and 60 bulge in the stomach area of the lure at 58 and 68. This bulging of the clear plastic outer lure halves creates a further optical illusion which enhances the visual appearance as the lure is retrieved through the water and provides the optical impression that the relatively thin, flat image created by patterns 30 and 40 is a three dimensional object.

Figure 4:
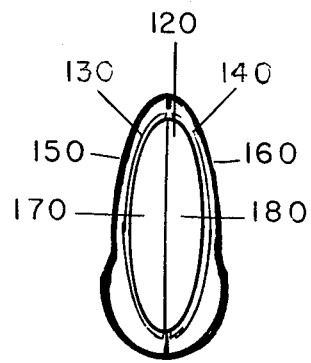
FIG. 4 is a cross-sectional view of an alternate embodiment of the present invention taken along the lines 2—2 of FIG. 1.

FIG. 4 is an alternate embodiment of the present invention wherein the clear plastic body halves 150 and 160 are relatively thin and the central body section 120 is comprised of a three dimensional molding having the general configuration desired by the final lure. In this embodiment, no lightening holes are incorporated as suggested by inner body 20 of FIG. 2 and the density of the material used to fabricate the inner body section 120 controls the average specific density of the completed lure. However, when desired a weight such as 28 of FIG. 2 may also be incorporated by providing an appropriate opening in body 120 to receive the ballast.

In the embodiment illustrated in FIG. 4, the graphic illustrations used to create the visual images 30 and 40 of FIGS. 2 and 3 are identified by reference designators 130 and 140. It should be noted that in the embodiment in FIG. 4, the graphic images 130 and 140 are larger than would be utilized in the embodiment depicted in FIGS. 2 and 3 because they must be formed about the three dimensional central body 120 when the lure is assembled.

If desired, any of the embodiments may be fabricated by providing a painted surface over the central lure or inner surfaces of the transparent lure body halves instead of the graphic reproduction previously suggested.

The method for fabricating the lure disclosed herein embodies the following steps (see FIG. 2): first, an inner body core such as 20 or 120 is fabricated. The inner body core then functions as an alignment pin for all subsequent production steps. Hook hangers are formed within the body core. During the steps of forming the inner body core, lightening holes may be provided as illustrated in FIG. 2 and ballast as dictated by the desired average specific gravity of the lure is added. A leader connector such as 23 of FIG. 2 is also attached to the inner body core to complete the center body section.

As suggested above, various types of center body sections may be incorporated in the lure and alternate methods for fabricating the center body section are presented below.

Figure 5:
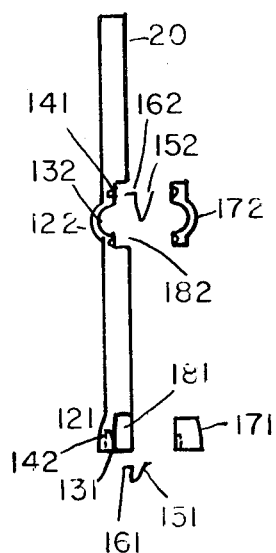
FIG. 5 is a bottom view of the inner core and hook hanger assemblies.
Figure 6:
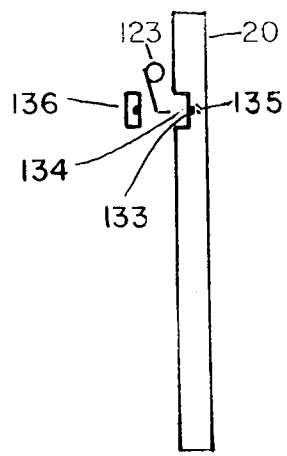
FIG. 6 is a top view of the inner core and leader attachment means.

In a preferred embodiment, a structural framework such as 20 of FIG. 2 is created by standard molding techniques or standard die cutting and pressure forming methods. The framework incorporates formed halves (121 and 122 of FIG. 5) for the hook hangers which will be incorporated in the lure. These formed halves are comprised of half of a cupped shaped depression, 131 and 132, and a hemispherical groove and bore combination 141 and 142 which are adapted to receive the support member 151 and 152 and locking pin 161 and 162 of the hook hanger wires. The hook hanger wires are placed in the grooves and bores and the hook hanger cups are completed by placing the mating half hook hanger cups 171 and 172 into the receiving slots 181 and 182 of the formed frame. The half cup sections 171 and 172 include a groove adapted to accommodate the supporting shanks 151 and 152 of the hook hanger wires. In this embodiment, the leader connecting hardware 123 is comprised of a formed eye supported by a wire shaft with a 90° bend in the bottom as illustrated in FIG. 6. A recess 133 is created in the frame 20 during the forming process and the recess incorporates a hemispherical groove 134 which receives the shank of leader attaching member 123. At the bottom of the hemispherical groove 132, a bore 135 is formed in the framework to accommodate the L-shaped locking pin at the terminating end of the leader affixing means 123. The leader affixing means 123 is placed in the hemispherical groove 134 and bore 135 of framework 20 and secured in place by a plug 136 which includes a hemispherical groove to accommodate the shank of the leader affixing means 123 and is further dimensioned to fill recess 133 of framework 20.

An alternate inner body core of the three dimensional type may be formed by first molding two halves of a lure body core such as 170 and 180 of FIG. 4. One half incorporates the half cup hook hanger forming means 121 and 122 of FIG. 5 and the leader attaching recess means 133 of FIG. 6. The other inner body core half incorporates formed areas duplicating the mating hook hanger cup halves 171 and 172 and the leader attaching fitting plug 136. This embodiment of the center body section is formed by molding or stamping and pressure forming the two lure body halves 170 and 180 as suggested above and inserting hook hanger hardware and leader tying hardware in the respective receiving channels and then sealing the two body halves together.

Figure 8:
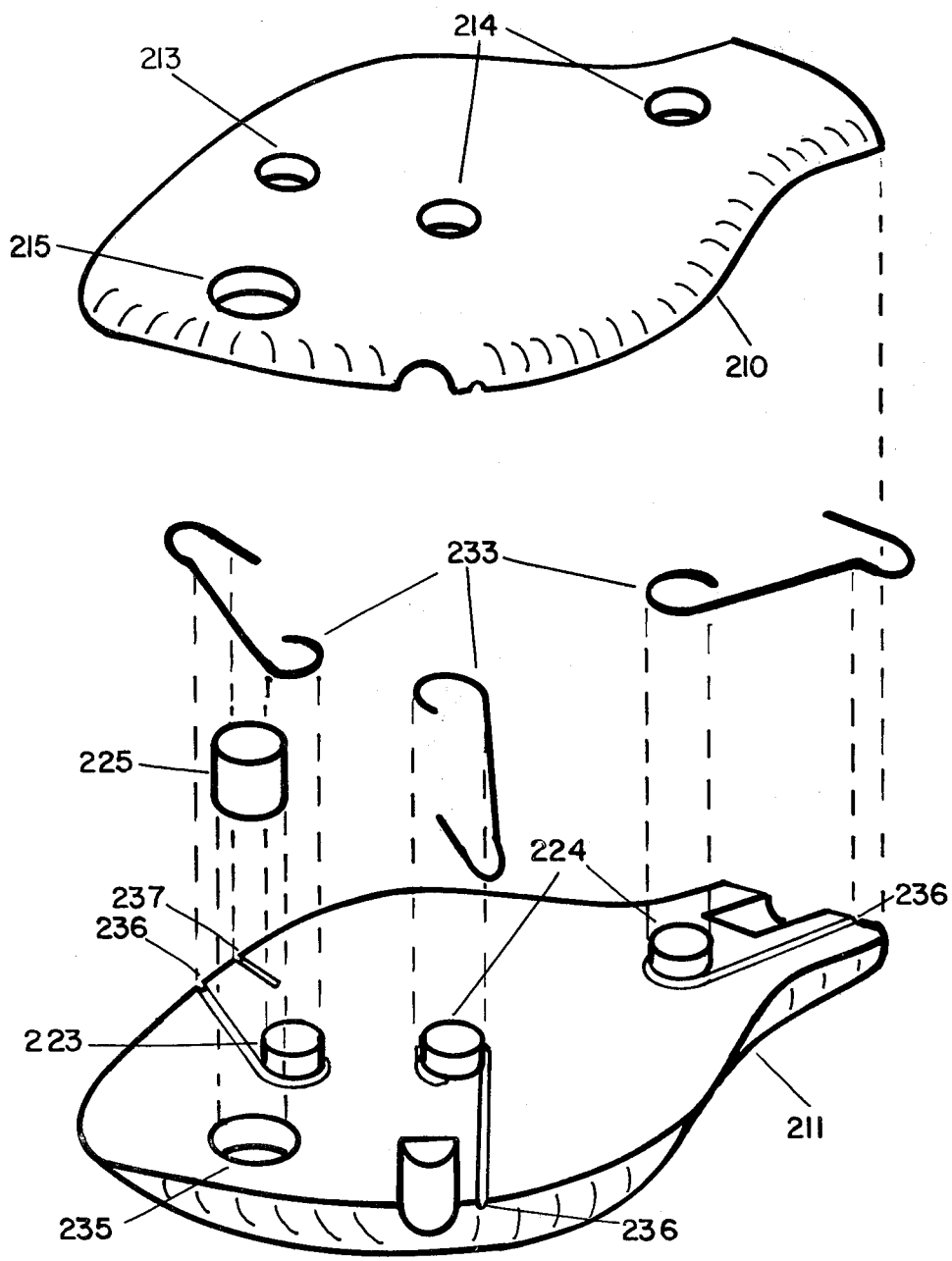
FIG. 8 is an exploded view of an embodiment of the present invention incorporating a split inner core assembly.

In the above alternate embodiment incorporating a split inner core body having a three dimensional characteristic, one core half may be considered a female half such as 210 of FIG. 8 and the other core half is fabricated to form a male section 211. The female core half 210 includes a plurality of apertures 213, 214 and 215. The purpose of these apertures is to receive the male locating pins 223 and 224 of the male core half 211 and the ballast weight 225. Locating pins 223 and 224 are dimensioned to receive wire forms 233 which function as either leader retaining means or hook retaining means as described in the co-pending patent application on "Lure Attachment Devices".

It should be noted that the male core half 211 includes an opening 235 to receive the part of the ballast weight 225 which is not received in opening 215 of the female core half 210. Furthermore, the male core half includes a plurality of half round grooves 236 and 237 adapted to receive the securing wire forms 233. A mirror image of grooves 236 and 237 occur in the female core half 210.

Figure 7:
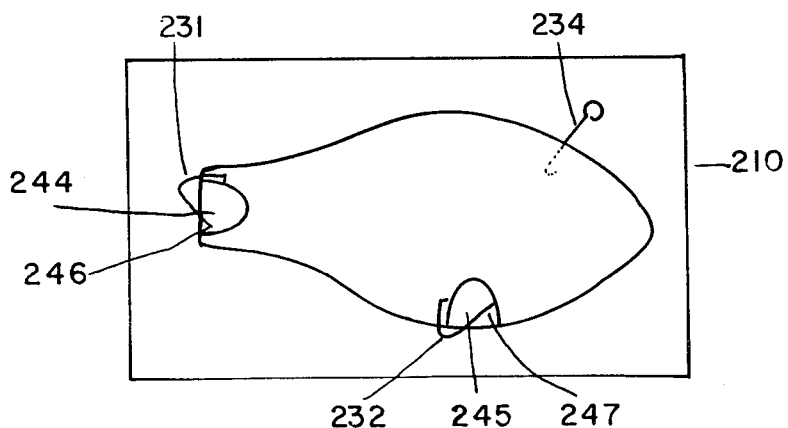
FIG. 7 is a top view of a mold half used to create an embodiment of this invention.

A third alternate embodiment of the center body section may be fabricated by using a mold such as 210 illustrated in FIG. 7. The mold 210 of FIG. 7 is actually one half of a mold which is adapted to mate with a mirror image to form a cavity which, when filled with a plastic material will result in a solid, three dimensional inner body core for the fishing lure of the present invention. The mold incorporates grooves 231, 232 and 234 which are adapted to receive hook hanging hardware and leader attaching means. The inner body core is formed by placing a cup shaped forming member 244 and 245 about the free ends of hook hanger wires 246 and 247. The hook hanger wires are then placed in grooves 231 and 232 of mold half 210. The leader connection fitting 223 is placed in the groove 234 of mold half 210 and the mating mold half is closed over mold half 210. The center body section is then formed by connecting the inner body core forming material into the mold. When the body section is formed, the mold halves are opened and the center body section is removed. Fillers 244 and 245 are removed from the free ends 246 and 247 of the hook hanging wires and completion of the lure is accomplished as described below.

When the center body section has been fabricated, a likeness of the bait to be duplicated by the lure is placed on either side of the center body section and pre-prepared transparent lure body halves are placed over the likeness and center body section and secured together to provide a water tight central compartment for the lure which will house the center body section and the images on either side thereof.

The transparent lure body halves are pre-prepared by molding them in the desired shape which includes openings to permit hook hanger hardware and leader connecting means to protrude from the completed lure. Also included in the molding step of the transparent lure body halves is the step of molding one or more lenses on the inner surface of the body half to provide the aforementioned optical impression of motion to various parts of the bait fish image. If desired, the lens portions of the inner surfaces of the lure body halves may be created by grinding the inner surface of the transparent body halves in the desired areas.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:
1. A fishing lure, comprising:
a center body section;
a fish attracting design including bait body element simulating designs covering said center body section, one of said designs including eyes;

a transparent outer body encasing said center body section and said fish attracting design;

said transparent outer body including an inner and outer surface; and lens means formed as concaved areas in said inner surface of said transparent outer body positioned to overlie predetermined body element simulating designs to optically affect the image created by said predetermined body element of said fish attracting design as a function of relative position between lure and observer to optically provide the illusion of motion within said fish attracting design.

2. A fishing lure as defined in claim 1, wherein said center body section includes: hook attaching means and leader attaching means.

3. A fishing lure as defined in claim 1, wherein said center body section is a thin section relative to said transparent outer body covering having a silhouette approximating the silhouette of the fishing lure and incorporating lightening cut outs.

4. A fishing lure as defined in claim 1, wherein said center body section is a core having the general three dimensional configuration of the fishing lure.

5. A fishing lure as defined in claim 1, wherein said center body section includes a ballast weight.

6. A fishing lure as defined in claim 5, wherein said fish attracting design is a thin film coating said center body section.

7. A fishing lure as defined in claim 1, wherein said fish attracting design is comprised of first and second graphic representations on a base relatively thin with respect to said center body section.

8. A fishing lure as defined in claim 1, wherein said transparent outer body covering is comprised of first and second body halves.

9. A method of fabrication a fishing lure, including the steps of:

forming a center body section;

placing a bait likeness on both sides of said center body section;

forming a transparent outer body section including inner and outer surfaces;

said step of forming a transparent outer body section inner surface including the further step of forming lenses as concaved areas in said inner surface and positioned to overlie predetermined elements of a fish illustrated in said bait likeness, said predetermined elements including fish eyes; and encasing said center body section and said bait likeness in said transparent outer body section.

10. A method of fabricating a fishing lure as defined in claim 9 wherein the method of creating said center body section includes the steps of:

forming a framework having the general outline of the completed fishing lure;

attaching hook hanger means to said framework; and attaching leader connection means to said framework.

11. A method of fishing lure fabrication as defined in claim 10, including the further step of adding a lure ballast weight to said framework.

12. A method of fabricating a fishing lure as defined in claim 9 wherein the method of creating said center body section includes the steps of:

creating a molded three dimensional inner body core including hook hangers and leader connection means.

13. A method of fabricating a fishing lure as defined in claim 9 wherein the method of creating said center body section includes the steps of:

forming an inner body core half;

attaching hook hanger means and leader connection means to said inner body core half; and sealing a second inner body core half to said inner body core half to create a three dimensional center body section.

* * * * *